US009784815B2

(12) United States Patent
Sendonaris

(10) Patent No.: US 9,784,815 B2
(45) Date of Patent: Oct. 10, 2017

(54) SEPARATING RANGING AND DATA SIGNALS IN A WIRELESS POSITIONING SYSTEM

(71) Applicant: NextNav, LLC, Sunnyvale, CA (US)

(72) Inventor: Andrew Sendonaris, Los Gatos, CA (US)

(73) Assignee: NextNav, LLC, Sunnyvale, CA (US)

( * ) Notice: Subject to any disclaimer, the term of this patent is extended or adjusted under 35 U.S.C. 154(b) by 321 days.

(21) Appl. No.: 14/668,849

(22) Filed: Mar. 25, 2015

(65) Prior Publication Data
US 2015/0198691 A1   Jul. 16, 2015

Related U.S. Application Data

(63) Continuation-in-part of application No. 13/535,128, filed on Jun. 27, 2012, now Pat. No. 9,035,829.

(60) Provisional application No. 61/972,190, filed on Mar. 28, 2014, provisional application No. 61/502,272, filed on Jun. 28, 2011, provisional application No. 61/502,276, filed on Jun. 28, 2011, provisional application No. 61/514,369, filed on Aug. 2, 2011.

(51) Int. Cl.
*G01S 1/08* (2006.01)
*G01S 1/04* (2006.01)
*H04W 4/02* (2009.01)
*H04B 1/7113* (2011.01)
*G01S 19/11* (2010.01)
*G01S 19/46* (2010.01)

(52) U.S. Cl.
CPC ............... *G01S 1/042* (2013.01); *G01S 19/11* (2013.01); *G01S 19/46* (2013.01); *H04B 1/7113* (2013.01); *H04W 4/023* (2013.01); *H04B 2201/709709* (2013.01)

(58) Field of Classification Search
CPC ... G01S 3/16; G01S 3/28; G01S 1/042; G01S 19/11; G01S 19/46; H04B 1/7113; H04W 4/023
USPC ........................................................ 342/386
See application file for complete search history.

(56) References Cited

U.S. PATENT DOCUMENTS

| 2009/0256742 | A1* | 10/2009 | Kawaguchi | G01S 5/0263 342/357.41 |
| 2012/0072110 | A1* | 3/2012 | Venkatraman | G01C 5/06 701/434 |
| 2013/0169484 | A1 | 7/2013 | Raghupathy et al. | |
| 2015/0198691 | A1 | 7/2015 | Sendonaris | |
| 2015/0208376 | A1 | 7/2015 | Sendonaris et al. | |

\* cited by examiner

*Primary Examiner* — Harry Liu

(57) ABSTRACT

Systems and methods for generating and transmitting ranging signals and data signals from transmitters in a wireless positioning system, and also for receiving and processing those signals at a mobile device. Different approaches are used, including separately transmitting the ranging signals and the data signals based on time, frequency, code, phase, or any combination thereof.

20 Claims, 10 Drawing Sheets

SEPARATING RANGING AND DATA SIGNALS IN A WIRELESS POSITIONING SYSTEM

FIELD

Various embodiments relate to wireless communications, and more particularly, to systems and methods for separately transmitting ranging signals and data signals in a wireless positioning system.

BACKGROUND

It is often desirable to estimate the position (or "location") of persons and things in a geographic area with a reasonable degree of accuracy. Accurate estimations of a position can be used to speed up emergency response times, track business assets, and link a consumer to a nearby business. Various techniques are used to estimate the position of an object. One such technique relies on transmission of signals from geographically-distributed transmitters to a mobile device that are used to estimate "ranges" (i.e., distances) between each transmitter and the mobile device. These ranges may then be used during a process called trilateration to estimate the position of the mobile device.

Systems such as a Global Navigation Satellite System (GNSS) combine "ranging" and "data" signals into one signal, and then transmit that combined signal to a GNSS receiver of a mobile device. The ranging signal is used to calculate the range between the mobile device and the satellite. The data signal provides information about the transmitter. One type of GNSS referred to as the Global Positioning System (GPS) modulates assistance data onto a ranging signal (e.g., at a rate of 50 bits per second). There are problems with this modulation approach. One problem is a low data rate. Another problem is a less accurate estimate of the range between the mobile device and a transmitter, mainly because the modulation approach does not allow for long coherent integration of the ranging signal from that transmitter. Another problem is that the cross-correlation between the data and ranging signals causes difficulties in resolving multipath in the ranging signals. Yet another problem is that the data signal need not be transmitted every time the ranging signal is transmitted, and doing so unnecessarily consumes network resources.

Accordingly, there is a need for improved techniques of transmitting ranging signals and data signals while maintaining desired accuracy of position estimates.

SUMMARY

Certain embodiments of this disclosure relate generally to systems and methods for transmitting and receiving ranging signals and data signals from terrestrial transmitters. Example systems and methods may generate a ranging signal and a data signal at a transmitter, and then separately transmit those ranging signals and data signals using different transmission time periods, different frequencies, different codes, and/or different phases. One or more mobile devices may receive and process those transmitted signals for use during trilateration.

DRAWINGS

DESCRIPTION

Various systems and methods for generating, transmitting, receiving, and processing ranging signals and data signals in a wireless positioning system are described below. One approach involves generating a ranging signal and a data signal, and the separately transmitting those generated signals from a transmitter to a mobile device such that the mobile device can extract information from those signals during signal processing. When implemented, the transmitter can transmit assistance data needed for trilateration separate from a ranging signal in a manner that enables generation of a more accurate range between the transmitter and the mobile device.

Further details about approaches for generating, transmitting, receiving, and processing ranging signals and data signals are provided below following a brief description of systems that are implicated by such approaches.

Example Systems

Figure 1:
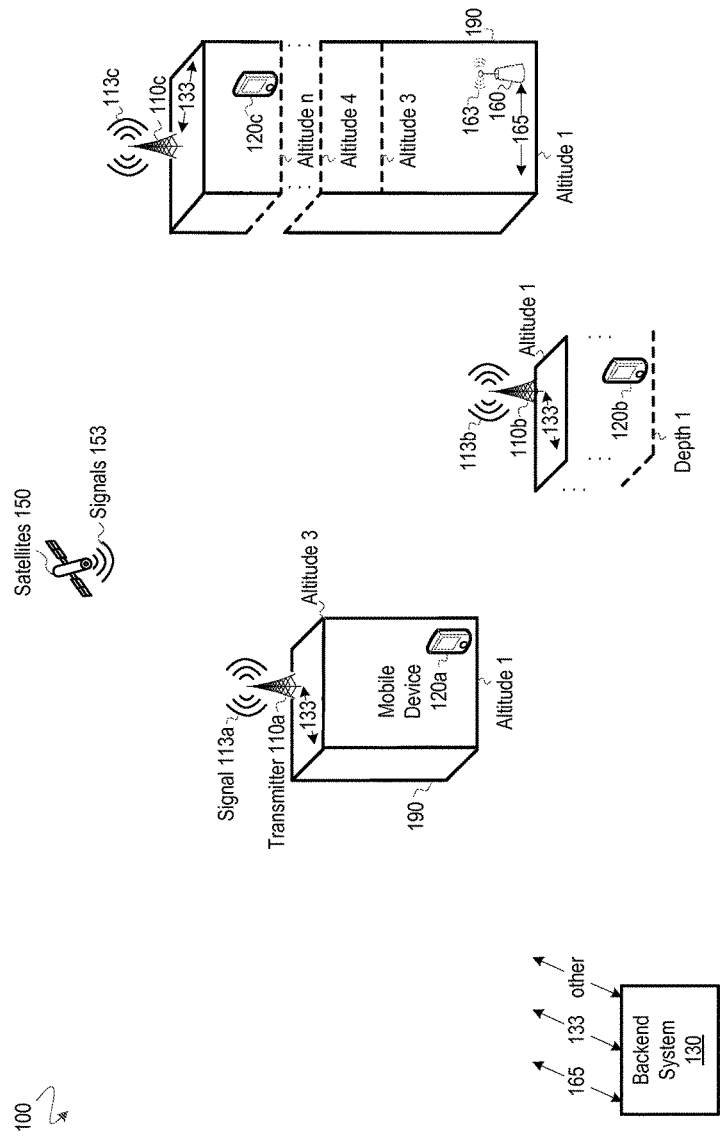
FIG. 1 depicts aspects of a positioning system with transmitters and a mobile device.

FIG. 1 depicts a positioning system 100 on which various embodiments may be implemented. The positioning system 100 includes any number of mobile device systems ("mobile devices") 120 that receive signals from, and/or send signals to transmitter systems ("transmitters") 110, satellite systems ("satellites") 150, and/or other systems ("nodes") 160 via corresponding communication links 113, 153 and 163. The mobile devices may also receive signals from, and/or send signals to other mobile devices 120 and a backend system ("backend") 130 (connectivity not shown).

The transmitters 110 transmit signals 113 (e.g., ranging signals and data signals) that are received by the mobile devices 120. The transmitters 110 also communicate with the backend 130 via the communication links 133. In some embodiments, the transmitters 110 transmit signals 113 using one or more common multiplexing parameters—e.g. time slot, pseudorandom sequence, frequency offset or phase offset. Each signal 113 from each transmitter 110 carries different information that, once extracted by the mobile device 120 or the backend 130, may identify the following: (1) the transmitter that transmitted the signal; (2) the latitude, longitude and altitude (LLA) of that transmitter; (3) pressure, temperature, humidity, and other atmospheric conditions at or near that transmitter; (4) ranging information; and (5) other information.

Figure 2:
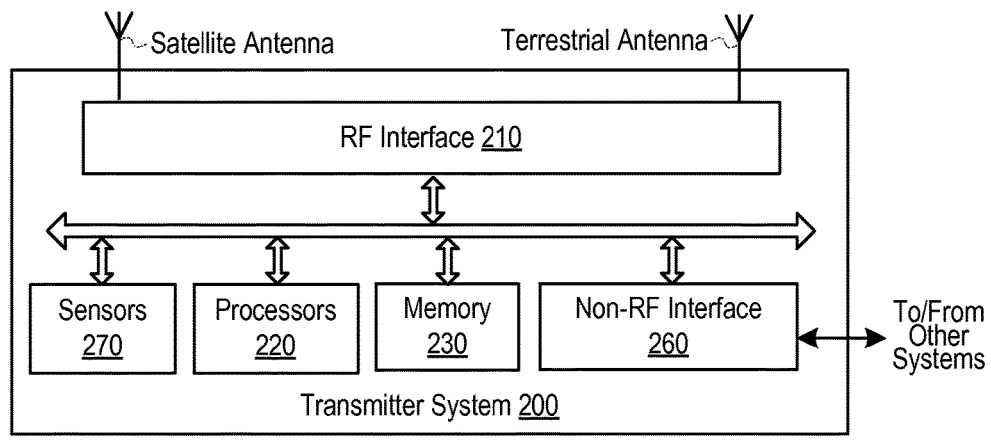
FIG. 2 depicts aspects of a transmitter.

By way of example, FIG. 2 depicts a transmitter 200 at which ranging signals and data signals are generated and transmitted. The transmitter 200 includes antenna(s) for receiving and transmitting signals from and to other systems (e.g., satellites, terrestrial transmitters, mobile devices), and/or an RF interface 210 facilitates the exchange of information with other systems and includes various circuitry (e.g., analog/digital logic and power circuitry, tuning circuitry, buffer and power amplifiers, and other components as is known in the art or otherwise disclosed herein). One of more processors 220 perform signal processing (e.g., extracting information from received signals, and generating signals for transmission to other systems at a selected time, using a selected frequency, using a selected code, and/or using a selected phase). Memory 230 provides storage and retrieval of data, and/or executable instructions for performing methods of operation described herein. The transmitter 200 also includes a non-RF interface 260 for exchanging information with other systems via other links beyond a radio link. The transmitter 200 also includes sensors 270 for measuring environmental conditions at or near the transmitter (e.g., pressure, temperature, humidity, wind), which may be transmitted to mobile devices.

Various mobile devices 120 are depicted at various altitudes or depths that are inside or outside various manmade or natural structures 190. Each mobile device 120 includes a location computation engine to determine positioning information based on the signals 113, 153, and/or 163 The mobile device 110 includes a signal processing component that: (1) demodulates the received signals; (2) estimates positioning information like travel time of the received signals and uses the positioning information to estimate the position of the mobile device 120 using processes for estimating the position like trilateration; and (3) extracts information (e.g., atmospheric information and location information associated with each transmitter) from the received signals and estimates the position of the mobile device 120 using that extracted information.

Figure 3:
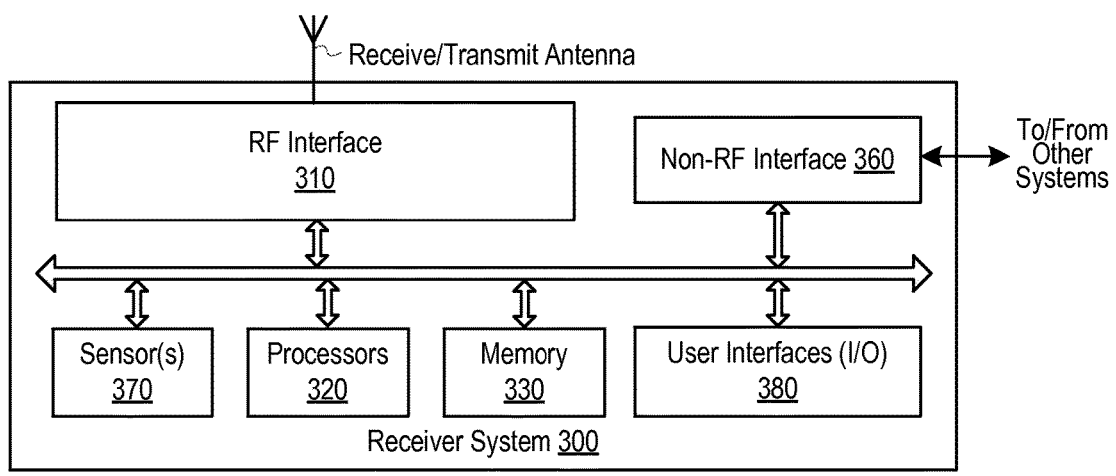
FIG. 3 depicts aspects of a mobile device.

By way of example, FIG. 3 depicts a mobile device 300 at which signals from transmitters are received and processed to extract information used to compute an estimated position of the mobile device 300. An RF interface 310 facilitates the exchange of information with other systems, and may include various circuitry (e.g., mixers, filters, amplifiers, digital-to-analog, and analog-to-digital converters as is known in the art or otherwise disclosed herein). Of course, other means for exchanging information with other systems is possible, including any wireless or wired transmission over any network via interface 360. Memory 330 provides storage and retrieval of data, and/or instructions relating to methods of operation described herein that may be executed by the processor 320. One or more processors 320 may form all or part of a positioning engine that determines positioning information from signaling received from other systems. Sensors 370 measure environmental conditions at or near the mobile device (e.g., pressure, temperature, humidity, wind), which may be compared to environmental conditions at or near transmitters to determine the altitude of the mobile device 300. Other information may be measured (e.g., acceleration, velocity, orientation, light, sound, or other conditions). User interfaces 380 permit a user to interact with the mobile device 300.

The backend 130, which may include any number of processors, data sources, and other components, communicates with various other systems, such as the transmitters 110, the mobile devices 120, and the other networks 160, and also performs position computations of a mobile device 120 in some embodiments.

One of ordinary skill in the art will appreciate that methods described herein may be carried out using processors at any or all of the transmitters 110, the mobile devices 120, the backend 130, and other components of the system 100.

Various methods for generating, transmitting, receiving and processing ranging signals and data signals using the above and other systems are described below.

Approaches for Separately Transmitting Ranging Signals and Data Signals

Several approaches for separately transmitting a ranging signal and a data signal in a positioning system are described below, including separate transmission based on time, frequency, code, phase, and combinations thereof. Of course, in some cases, it may be advantageous to transmit one signal with data and ranging portions in addition to a ranging-only signal and a data-only signal using the separation methods of this disclosure. Thus, instead of two types of signals (e.g., ranging signals and data signals), there would be three types of signals (e.g., ranging signals, data signals, and ranging+ data signals). Note that, in general, the three types of signals may use different signal bandwidths to facilitate accurate ranging and data transmission.

The considerations involved in a terrestrial system using these ranging signals and data signals may differ somewhat from those involved in a satellite system. For example, cross-correlation between the data and ranging signals affecting the quality of range estimates on the ranging signal may not be of concern in a satellite system. Also, the link budget in the satellite system may not afford a mobile device the ability to detect and resolve weak line-of-sight signals in the presence of stronger reflected multipath signals.

Figure 4:
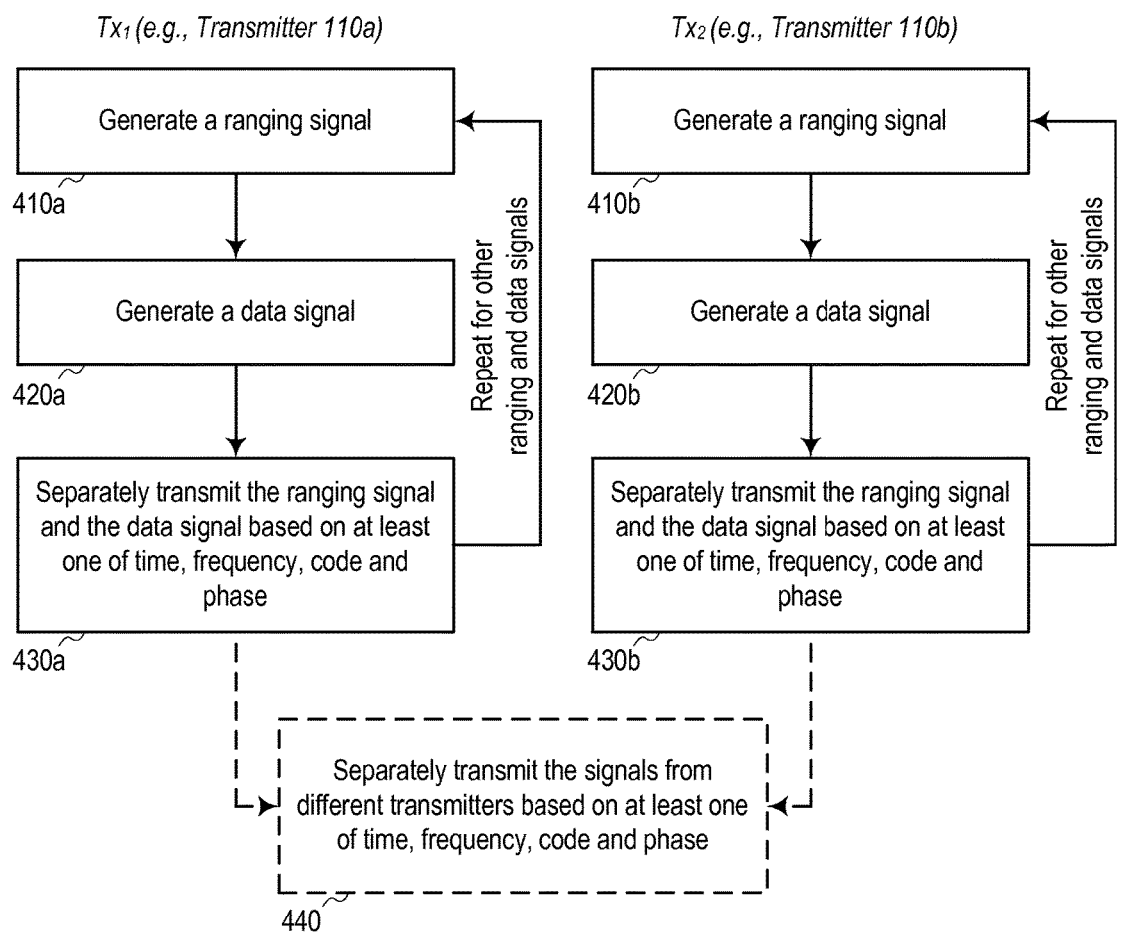
FIG. 4 illustrates a process for separately transmitting ranging signals and data signals.

By way of example, FIG. 4 illustrates a method for separately transmitting ranging signals and data signals from the same transmitter, and/or from different transmitters. Transmission of ranging signals and data signals from two transmitters, $Tx_1$ and $Tx_2$ (e.g., transmitters 110a and 110b from FIG. 1), is illustrated in FIG. 4; however, it is to be understood that the method illustrated in FIG. 4 can be expanded to more than two transmitters.

As shown, each transmitter generates a ranging signal (410), and also generates a data signal (420). The ranging signal may include, for example, pilot symbols that enable long coherent integration. The data signal may include, for example, position information corresponding to the transmitter like latitude, longitude, altitude (LLA), atmospheric conditions near the transmitter (e.g., pressure, temperature, humidity), timing information (e.g., timing error due to communication channel delays), or other data.

On a transmitter-by-transmitter basis, the ranging signal and the data signal for that transmitter may be separately transmitted based on one or more of time, frequency, code, and phase (430). Signals from two or more transmitters may also be separately transmitted based on one or more of time, frequency, code, and phase (440).

Additional discussion regarding time-based, frequency-based, code-based, and phase-based transmission of ranging signals and data signals is provided below. It is noted that an approach taken by a particular system may depend on various constraints of that system, such as coverage area, spectrum availability, multipath resolution of signals, and power constraints.

Separation Based on Time

Figure 5:
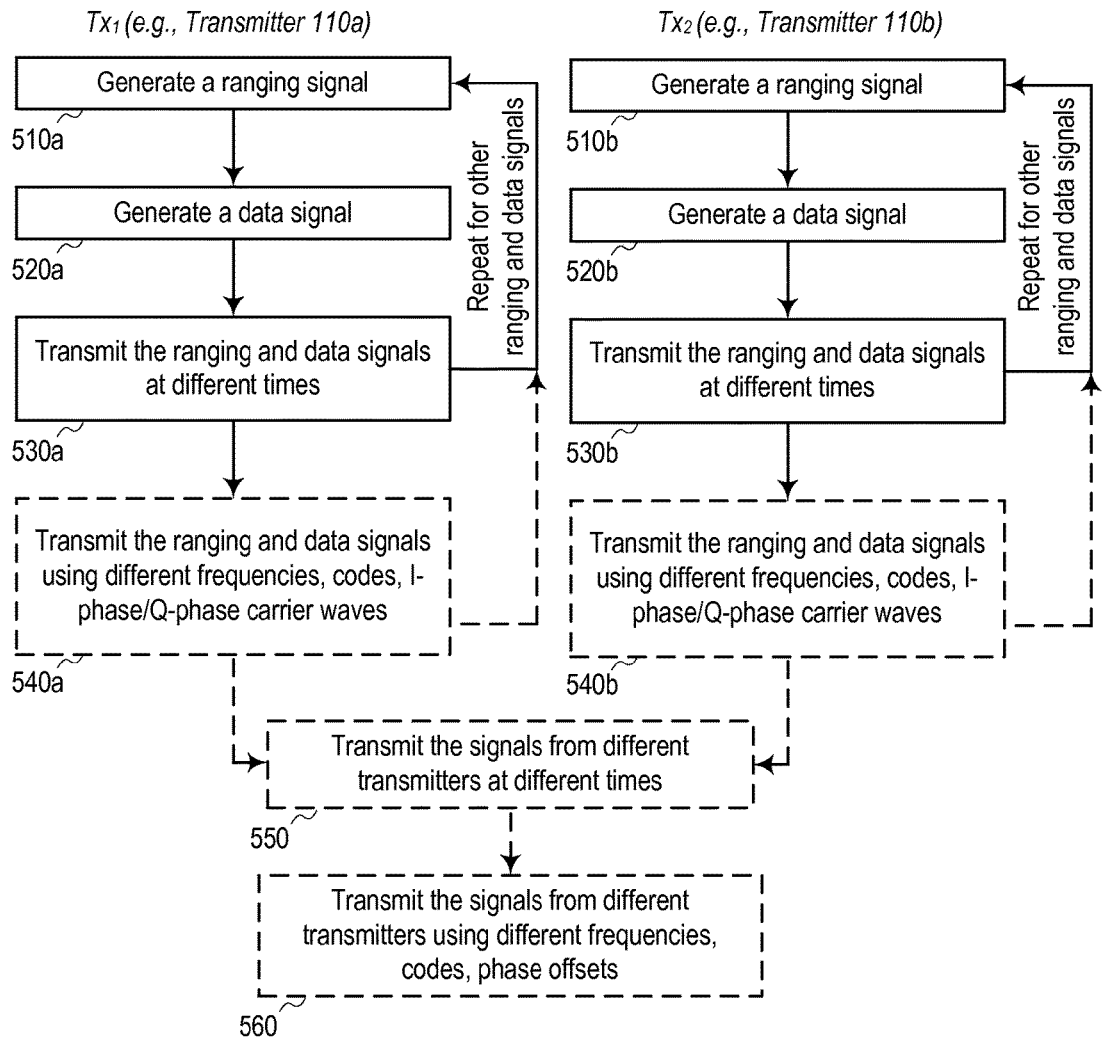
FIG. 5 illustrates a process for transmitting ranging signals and data signals using different time periods.

FIG. 5 illustrates a method for time-based transmission of ranging signals and data signals. As shown, ranging signals and data signals are generated by one or more transmitters (510, 520). The generated ranging signal is transmitted at a different time than the generated data signal (530)—e.g., in different slots or frames. As indicated, the process of generating ranging signals and data signals (510, 520), and then separately transmitting those signals at different times (530) may be repeated.

In addition to using separate time periods to transmit the ranging signal and the data signal, different frequencies, codes, and/or phase offsets may be used to transmit those signals (540). For example, a first time period, a first range of frequencies, and/or a first code may be used to transmit the ranging signal, and a second time period, a second range of frequencies, and/or a second code may be used to transmit the data signal. The process of generating ranging and data signals (510, 520), and then separately transmitting those signals at different times, frequencies, codes, and/or phase offsets (540) may be repeated.

Using separate time periods for ranging signals and data signals eliminates the problem of multipath resolution caused by cross-correlation between combined ranging signals and data signals, and also permits data signals to be transmitted less frequently than ranging signals, which leads to resource use efficiency in some embodiments.

Signals from different transmitters may also be transmitted during different time periods (550)—e.g., different slots or frames. Similarly, those signals from different transmitters may also be transmitted using different frequencies, codes, and/or phase offsets in addition to transmission during different times (560). For example, a first time period, a first range of frequencies, and/or a first code may be used to transmit a first ranging or data signal from a first transmitter (e.g., $Tx_1$), and a second time period, a second range of frequencies, and/or a second code may be used to transmit a second ranging or data signal from a second transmitter (e.g., $Tx_2$).

It is noted that the duration of times allocated to separately transmit signals need not be the same.

Figure 6A:
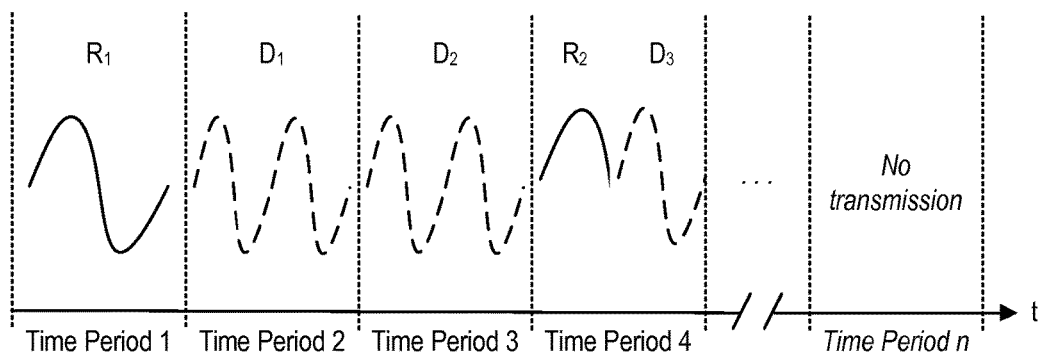
FIG. 6A, FIG. 6B, FIG. 6C and FIG. 6D illustrate different approaches for transmitting ranging signals and data signals using different transmission time periods.

FIG. 6A through FIG. 6D each illustrate different aspects related to time-based transmission of ranging signals (R) and data signals (D). It is noted that each instance of R and D may refer to signals that include the same information, or different information. FIG. 6A illustrates that a transmitter may transmit ranging signals (R) at different times than data signals (D). In some cases, a particular signal is transmitted during a particular time period (e.g., see signals $R_1$, $D_1$ and $D_2$). In other cases, signals may be transmitted at different times during the same time period (e.g., see signals $R_2$ and $D_3$).

Figure 6B:
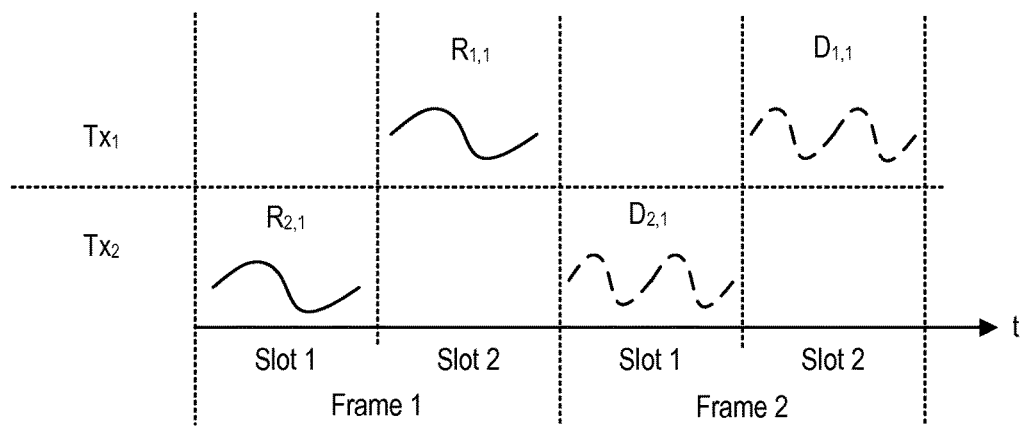
Figure 6C:
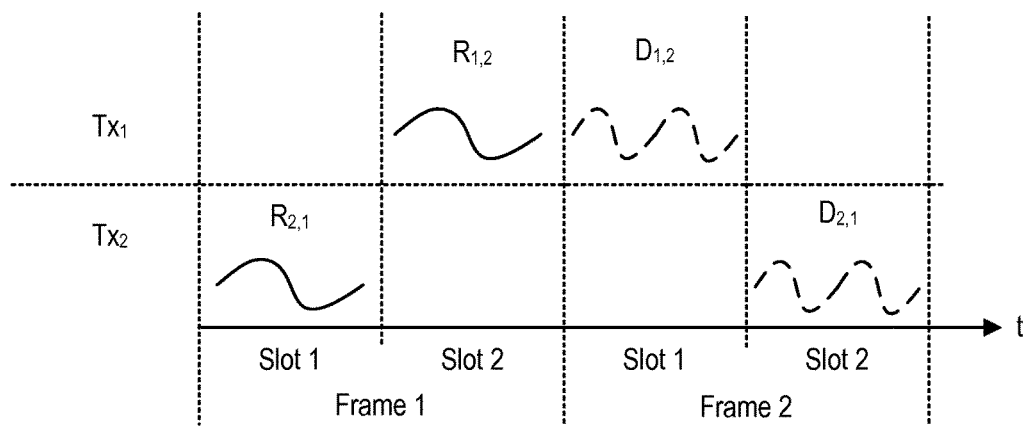
Figure 6D:
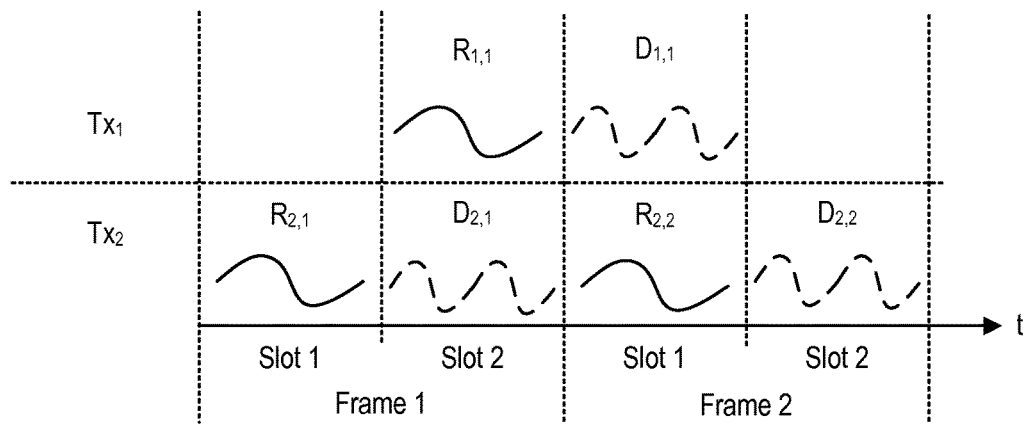

FIG. 6B, FIG. 6C and FIG. 6D illustrate time-based transmission of signals from different transmitters $Tx_1$ and $Tx_2$. The following notation is used in various figures for each signal: (1) the letters R and D designate the type of signal as a ranging signal and a data signal, respectively; (2) the first subscripted number 1 and 2 designates the transmitter that transmitted the signal as the first transmitter $Tx_1$ and the second transmitter $Tx_2$, respectively; and (3) the second subscripted number designates different signals of the same type (e.g., a first ranging signal from the first transmitter $R_{1,1}$, and a second ranging signal from the first transmitter $R_{1,2}$).

FIG. 6B illustrates time-based transmission of signals from the different transmitters. As shown, ranging (R) and data (D) signals for each transmitter may be transmitted using an assigned time slot, but during different periods of times (e.g., "frames" that comprise multiple slots). FIG. 6C illustrates that the time slot used by each transmitter may change across frames. FIG. 6D illustrates that two transmitters may transmit signals using the same time slot, but that ranging signals and data signals from each particular transmitter are transmitted in separate slots.

Separation Based on Frequency

Figure 7:
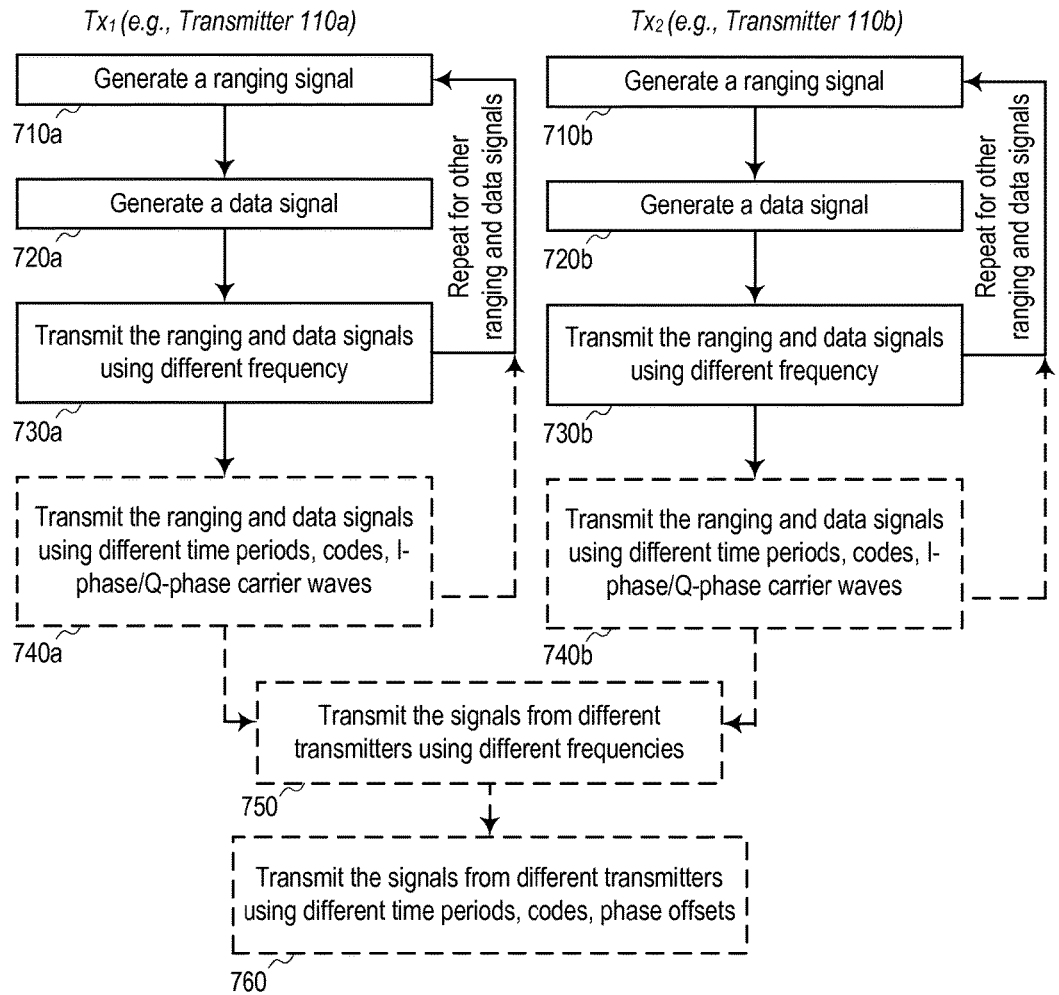
FIG. 7 illustrates a process for transmitting ranging signals and data signals using different frequencies.

FIG. 7 illustrates a method for frequency-based transmission of ranging signals and data signals. As shown, ranging signals and data signals are generated by one or more transmitters (710, 720). Different frequencies are used to transmit the ranging signal and the data signal (730). As indicated, the process of generating ranging signals and data signals (710, 720), and then separately transmitting those signals using different frequencies (730) may be repeated.

In addition to using separate frequencies to transmit the ranging signal and the data signal, different time periods, codes, and/or phase offsets may be used to transmit those signals (740). For example, a first time period, a first range of frequencies, and/or a first code may be used to transmit the ranging signal, and a second time period, a second range of frequencies, and/or a second code may be used to transmit the data signal. The process of generating ranging signals and data signals (710, 720), and then separately transmitting those signals at different times, frequencies, codes, and/or phases (740) may be repeated.

Note that the ranging signals and data signals may be transmitted with non-overlapping frequency spectrums, or may be transmitted with overlapping frequency spectrums and specific frequency offsets. Using non-overlapping spectrums may eliminate the problem of multipath resolution caused by cross-correlation between ranging signals and data signals.

Signals from different transmitters may also be transmitted using different frequencies (750). Similarly, those signals from different transmitters may also be transmitted using different time periods, codes, and/or phase offsets in addition to different frequencies (760). For example, a first time period, a first range of frequencies, and/or a first code may be used to transmit a first ranging or data signal from a first transmitter (e.g., $Tx_1$), and a second time period, a second range of frequencies, and/or a second code may be used to transmit a second ranging or data signal from a second transmitter (e.g., $Tx_2$).

It is noted that the size of the frequency ranges allocated to separately transmitted signals need not be the same. It is further noted that the frequency ranges may or may not overlap.

Figure 8A:
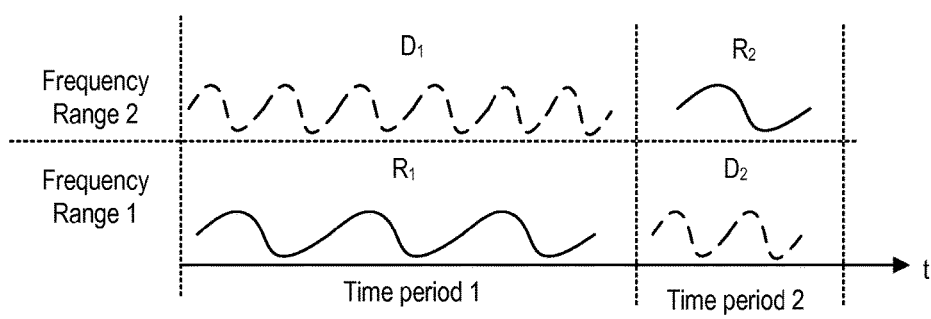
FIG. 8A, FIG. 8B, FIG. 8C and FIG. 8D illustrate different approaches for transmitting ranging signals and data signals using different frequencies.
Figure 8B:
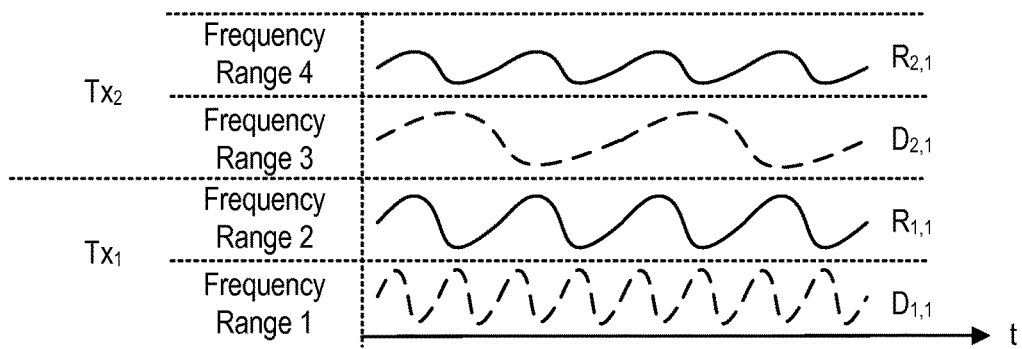
Figure 8C:
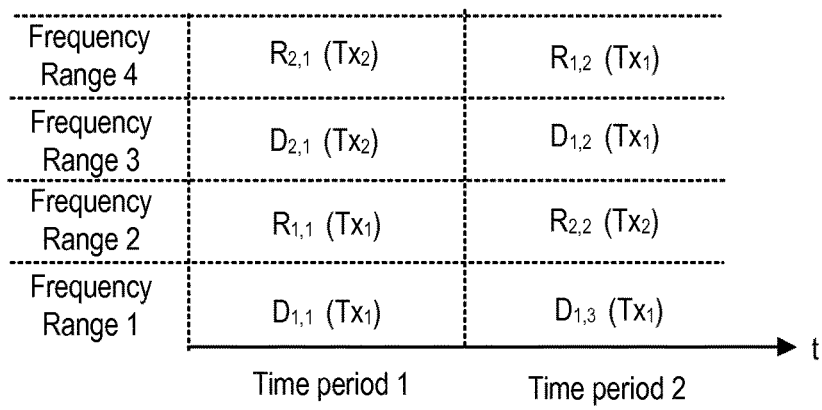

FIG. 8A, FIG. 8B and FIG. 8C each illustrate different aspects related to frequency-based transmission of ranging signals (R) and data signals (D).

FIG. 8A illustrates use of two frequencies or frequency ranges by the same transmitter to simultaneously transmit ranging signals and data signals. FIG. 8A also shows that different frequencies may be used to transmit ranging signals and data signals during different time periods.

FIG. 8B illustrates use of different sets of frequency ranges by different transmitters for simultaneous transmissions of signals, where a first transmitter uses first and second frequency ranges to simultaneously transmit ranging signals and data signals, and a second transmitter uses third and fourth frequency ranges to simultaneously transmit ranging signals and data signals.

FIG. 8C illustrates mixed use of four frequency ranges during different time periods where the transmitters use a first number of the four frequency ranges during a first period of time (e.g., both $Tx_1$ and $Tx_2$ use two frequency ranges during the first period of time), and the transmitter uses a second number of the four frequency ranges during a second period of time (e.g., $Tx_1$ uses three frequency ranges during the second period of time, and $Tx_2$ uses one frequency range during the second period of time).

Figure 8D:
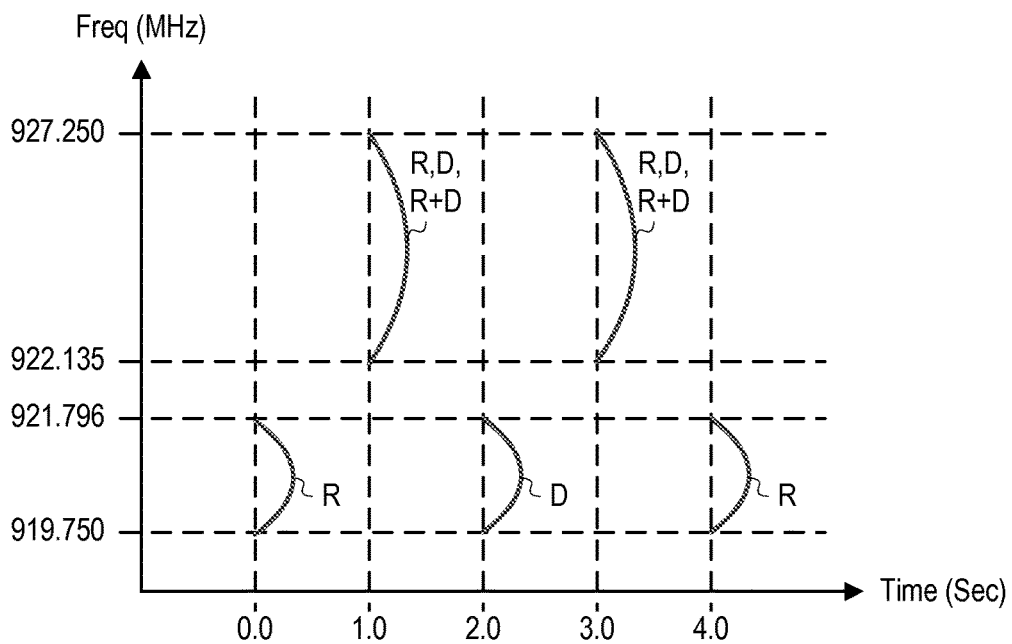

FIG. 8D illustrates yet another approach for separately transmitting ranging signals and data signals based on frequency and time. As shown, ranging signals (R) and data signals (D) may be transmitted using the same frequency (e.g., 2 MHz), but at separate times (e.g., 0.0 and 2.0 seconds). A separate signal—e.g., ranging signal (R), data signal (D), or a combination of ranging signals and data signals (R+D)—may be transmitted using a different frequency (e.g., 5 MHz) and at a different time (e.g., 1.0 and 3.0 seconds).

Separation Based on Code

Figure 9:
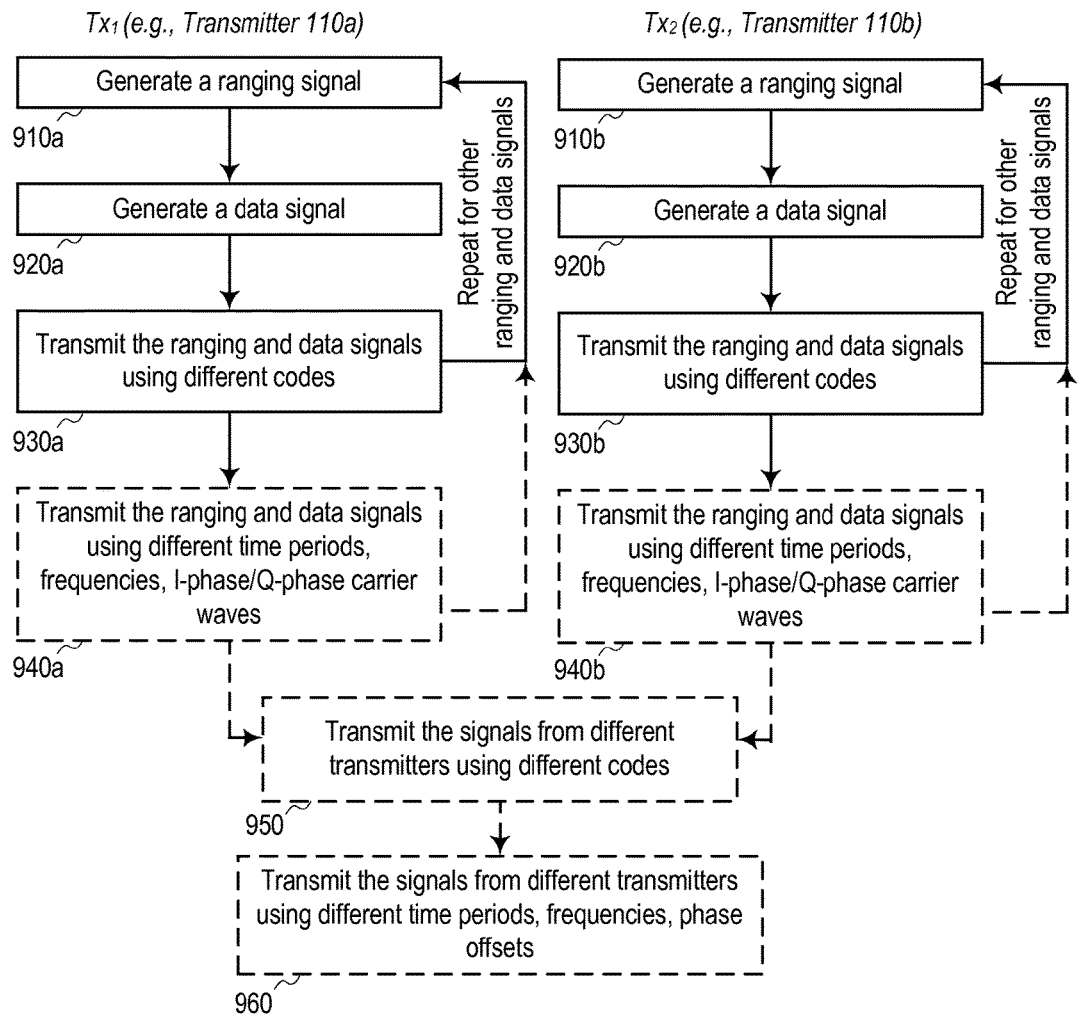
FIG. 9 illustrates a process for transmitting ranging signals and data signals using different codes.

FIG. 9 illustrates a method for code-based transmission of ranging signals and data signals. Various codes are contemplated, including PN (pseudo noise) codes, Walsh codes or other codes in a spread-spectrum system. In one embodiment, the codes are orthogonal to each other; however, the codes need not be orthogonal to each other. The choice of codes may be selected so that the cross-correlation between the data and ranging signals are minimized to facilitate accurate multipath resolution and range determination using the ranging signal at the mobile device.

As shown in FIG. 9, ranging signals and data signals are generated by one or more transmitters (910, 920). Different codes are used to transmit the ranging signal and the data signal (930). As indicated, the process of generating ranging signals and data signals (910, 920), and then separately transmitting those signals using different codes (930) may be repeated.

In addition to using separate codes to transmit the ranging signal and the data signal, different time periods, frequencies, and/or phases may be used to transmit those signals (940). The process of generating ranging signals and data signals (910, 920), and then separately transmitting those signals at different times, frequencies, codes, and/or phase offsets (940) may be repeated.

Signals from different transmitters may also be transmitted using different codes (950). Similarly, those signals from different transmitters may also be transmitted using different time periods, frequencies, and/or phase offsets in addition to different codes (960).

Figure 10A:
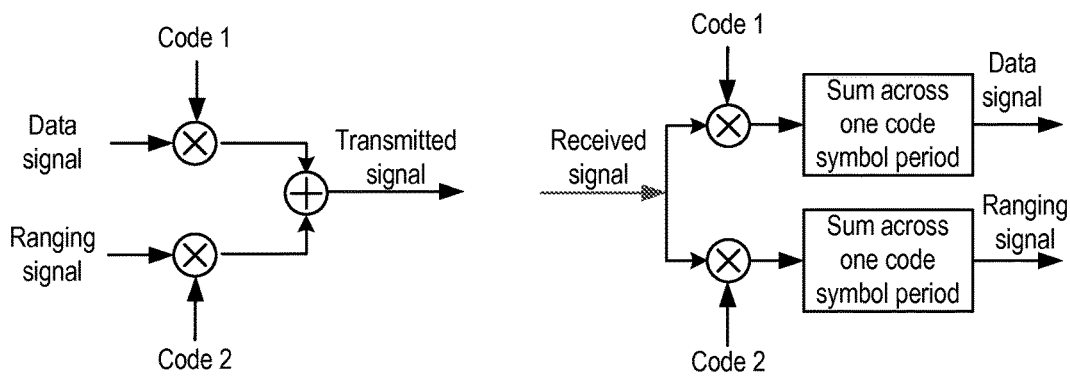
FIG. 10A illustrates block diagrams of systems for transmitting ranging signals and data signals using different codes, and for receiving and processing those signals.
Figure 10B:
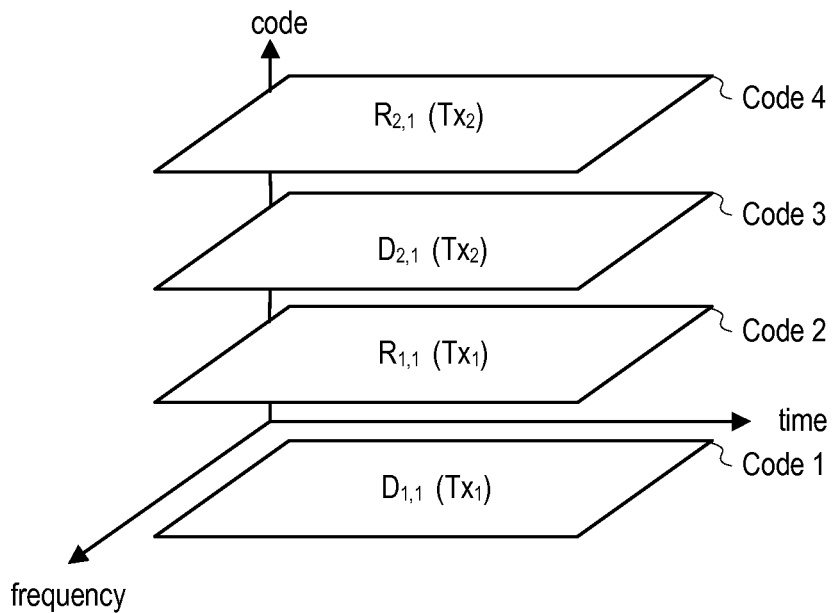
FIG. 10B and FIG. 10C illustrate different approaches for transmitting ranging signals and data signals using different codes.
Figure 10C:
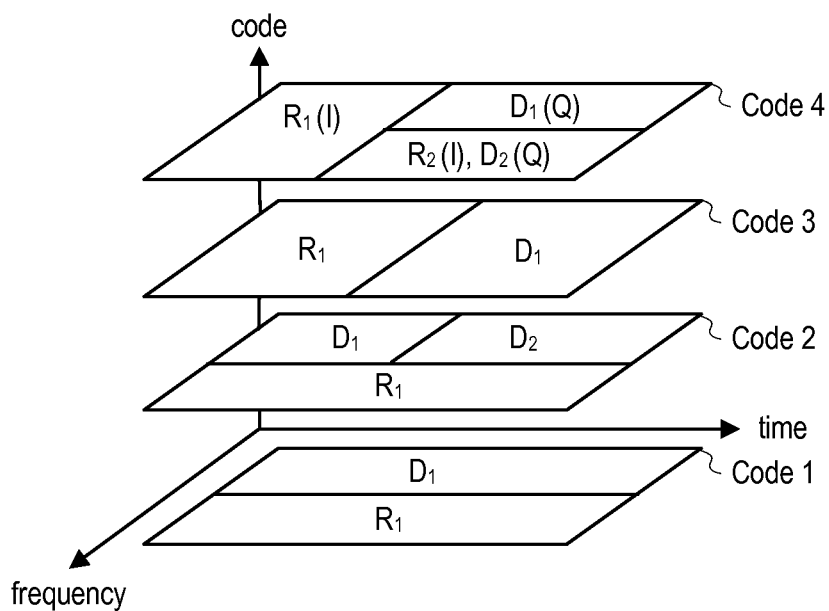

FIG. 10A, FIG. 10B and FIG. 10C each illustrate different aspects related to code-based transmission of ranging signals (R) and data signals (D).

FIG. 10A illustrates a block diagram of a system that uses one code to transmit a ranging signal and another code to transmit a data signal. FIG. 10A also illustrates a block diagram of a system that receives and processes coded signals.

FIG. 10B illustrates use of different sets of codes by different transmitters ($Tx_1$ and $Tx_2$), where a first transmitter ($Tx_1$) uses first and second codes to simultaneously transmit a ranging signal ($R_{1,1}$) and a data signal ($D_{1,1}$), and a second transmitter ($Tx_2$) uses third and fourth codes to simultaneously transmit a ranging signal ($R_{2,1}$) and a data signal ($D_{2,1}$).

FIG. 10C illustrates mixed use of four codes during different time periods and using different frequencies. As shown: (1) Code 1 is used to transmit a ranging signal $R_1$ and a data signal $D_1$ using two different frequencies; (2) Code 2 is used to transmit a ranging signal $R_1$ and data signals $D_1$ and $D_2$ using two different frequencies, and to transmit the different data signals $D_1$ and $D_2$ using the same frequency during different time periods; (3) Code 3 is used to transmit a ranging signal $R_1$ and a data signal $D_1$ during two different time periods; and (4) Code 4 is used to transmit a ranging signal $R_1$ and a data signal $D_1$ using two different phases (designated by I and Q), where such signals may be transmitted at the same or different times, and/or by using the same or different frequencies. While not marked, the different ranging signals and data signals illustrated in FIG. 10C may include signals from the same transmitter or different transmitters.

Separation Based on Phase

Figure 11:
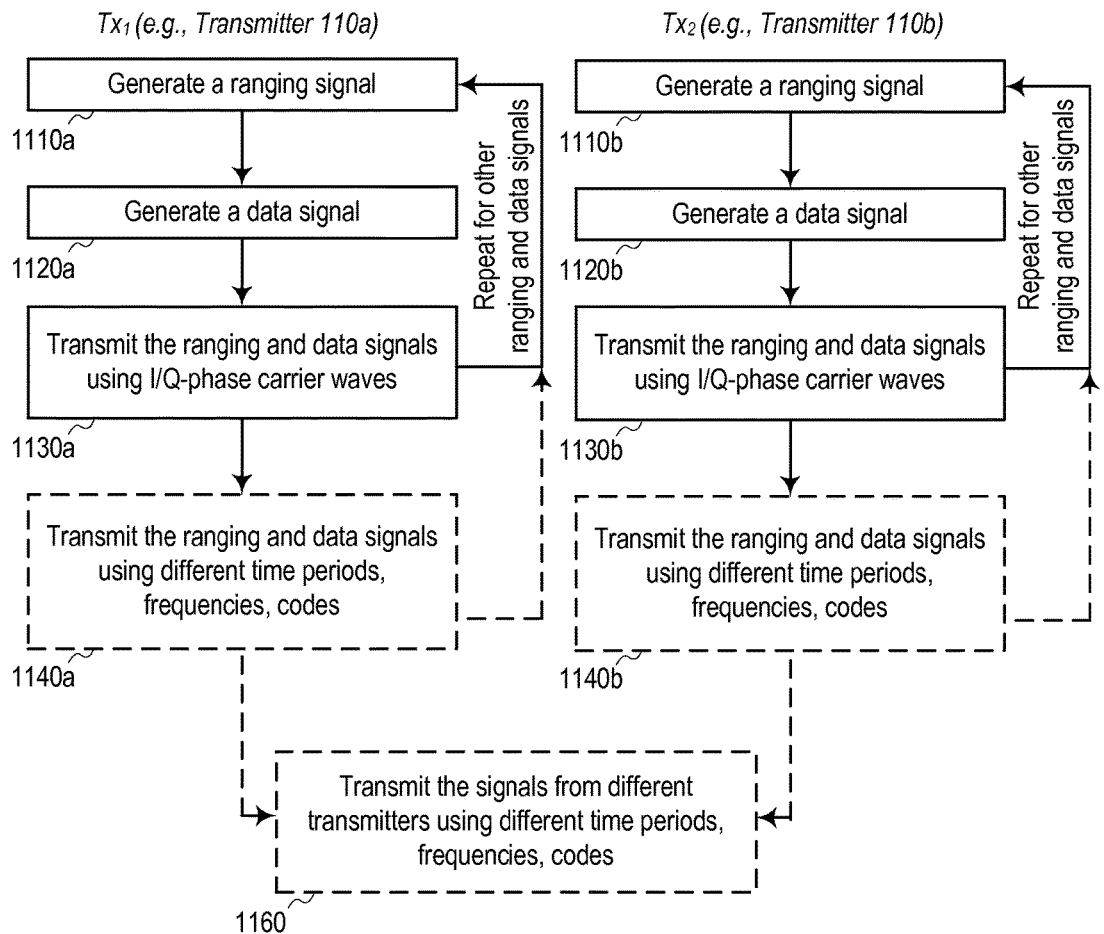
FIG. 11 illustrates a process for transmitting ranging signals and data signals using different phases.

FIG. 11 illustrates a method for phase-based transmission of ranging signals and data signals. For example, a phase-based transmission method may allocate the signals to different branches of a complex signal (e.g., an in-phase branch and a quadrature-phase branch). These branches are sometimes referred to as the real-part and the imaginary-part of the complex signal.

As shown in FIG. 11, ranging signals and data signals are generated by one or more transmitters (1110, 1120). Different I/Q branches are used to transmit the ranging signals and data signals (1130). As indicated, the process of generating ranging signals and data signals (1110, 1120), and then separately transmitting those signals using different I/Q branches (1130) may be repeated.

In addition to using separate I/Q branches or some other approach using phase-based offsets to transmit the ranging signal and the data signal, different time periods, frequencies, and/or codes may be used to transmit those signals (1140). For example, a ranging signal may be transmitted during a first time period, using a first frequency, using a first code, and/or using a first carrier wave, and a data signal may be transmitted during a second time period, using a second frequency, using a second code, and using the first carrier wave at a phase offset. When using codes in addition to phase to transmit the ranging signal and the data signal, the choice of codes may be selected so that the cross-correlation between the data and ranging signals are minimized to facilitate accurate multipath resolution and range determination using the ranging signal at the mobile device. The process of generating ranging signals and data signals (1110, 1120), and then separately transmitting those signals using different times, frequencies, codes, and/or phase offsets (1140) may be repeated.

Signals from different transmitters may also be transmitted using different times, frequencies and codes (1160). Although not shown, it is possible to transmit signals from different transmitters using different phase offsets.

Figure 12:
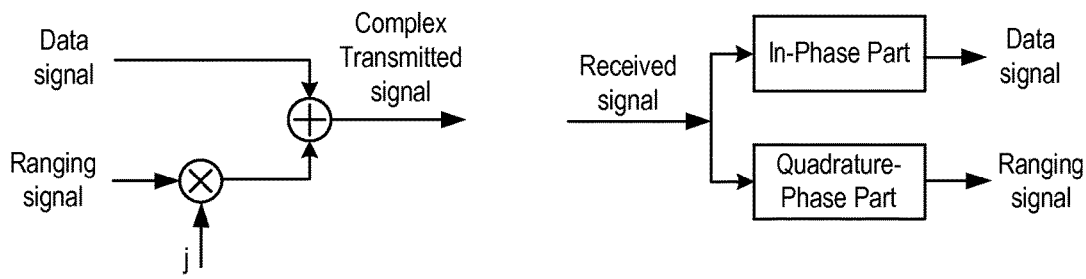
FIG. 12 illustrates block diagrams of systems for transmitting ranging signals and data signals using different phases, and for receiving and processing those signals.

FIG. 12 shows a block diagram of an I/Q modulator that mixes the data signal with a carrier waveform, and mixes the ranging signal with the same waveform at a 90-degree phase offset. Of course, the opposite may be true, where the ranging signal is mixed with the waveform and the data signal is mixed with the waveform at a 90-degree phase offset. The mixed signals are added to each other to produce a complex signal that is transmitted to a mobile device. FIG. 12 also shows a block diagram of an I/Q demodulator. Upon receipt of the complex signal, the mobile device may reverse the operations in order to process the data signal and the ranging signal.

Dynamic Power Allocation

It is noted that the power allocated to the transmitted ranging signals and data signals need not be the same. As such, the power levels for signals may be selectively varied on signal-by-signal, transmitter-by-transmitter, and/or transmission-time-period-by-transmission-time-period bases.

Content of Data Signals

In some, but not necessarily all embodiments, data signals include different types of information identifying: the position of the transmitter (e.g., latitude, longitude, altitude), atmospheric conditions at the transmitter (e.g., pressure, temperature, humidity, wind speed and direction, and other weather conditions), an identifier of the transmitter, timing information (e.g., a reference time correction associated with the transmitter, GPS timing, other timing offsets), a transmit quality metric, security information, encryption information, and/or other information useful in determining the position of a mobile device. The data signals may also include a preamble signal component, a pilot signal component, and/or a guard signal component. The size of each data signal (in terms of number of symbols) may vary by transmission. Additionally, data comprising a particular type of information (e.g., an identifier of the transmitter) may be split into multiple parts that are each transmitted in a different data signal, and later combined by the mobile device after both signals are received and processed. In one embodiment, any type of modulation is possible for each signal.

Content of Ranging Signals

In some, but not necessarily all embodiments, the ranging signals sent from each transmitter include a transmitter sequence encoded with a spreading code, which may be different for different transmitters. The ranging signals may also include a preamble signal component, a pilot signal component, and/or a guard signal component (which may include a gold code sequence). In one embodiment, any type of modulation is possible for each signal.

Example Methods

Functionality and operation disclosed herein may be embodied as one or more methods implemented, in whole or in part, by machine(s)—e.g., processor(s), computers, or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more processors cause the processors to carry out the method(s).

It is noted that method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency.

By way of example, not by way of limitation, method(s) and processor(s) or other means may: generate a first ranging signal at a first transmitter; generate a first data signal at the first transmitter; and separately transmit, from the first transmitter, the first ranging signal and the first data signal using (1) a different transmission time period for each signal, (2) a different frequency for each signal, (3) a different code for each signal, or (4) a different phase for each signal. In one embodiment, the first data signal includes information that specifies one or more atmospheric conditions measured at the first transmitter and information that specifies the location of the first transmitter.

In one embodiment, the first ranging signal and the first data signal are transmitted using two or more of (1) a different transmission time period for each signal, (2) a different frequency for each signal, (3) a different code for each signal, and (4) a different phase for each signal.

In one embodiment, the first ranging signal and the first data signal are transmitted using three or more of (1) a different transmission time period for each signal, (2) a different frequency for each signal, (3) a different code for each signal, and (4) a different phase for each signal.

In one embodiment, the first ranging signal and the first data signal are transmitted using (1) a different transmission time period for each signal, (2) a different frequency for each signal, (3) a different code for each signal, and (4) a different phase for each signal.

In one embodiment, the first ranging signal is transmitted during a first period of time, and the first data signal is transmitted during a second period of time.

In one embodiment, a size of the first period of time is different than a size of the second period of time. In one embodiment, a size of the first period of time is equal to a size of the second period of time.

In one embodiment, the first ranging signal is transmitted using a predefined slot from among a plurality of slots during a first transmission period, and the first data signal is transmitted using the predefined slot during a second transmission period.

In one embodiment, the first ranging signal is transmitted using a first predefined slot from among a plurality of slots during a first transmission period, and the first data signal is transmitted using a second predefined slot from among the plurality of slots during a second transmission period.

In one embodiment, the first ranging signal is transmitted using a first predefined slot from among a plurality of slots during a first transmission period, and the first data signal is transmitted using a second predefined slot from among the plurality of slots during the first transmission period.

In one embodiment, the first ranging signal is transmitted using a first range of frequencies, and the first data signal is transmitted using a second range of frequencies.

In one embodiment, a size of the first range of frequencies is different than a size of the second range of frequencies. In one embodiment, a size of the first range of frequencies is equal to a size of the second range of frequencies.

In one embodiment, the first range of frequencies and the second range of frequencies do not share any frequency. In one embodiment, the first range of frequencies and the second range of frequencies share at least one frequency.

In one embodiment, the first range signal and the first data signal are transmitted during overlapping time periods.

Method(s) and processor(s) or other means may further or alternatively: generate a second ranging signal at the first transmitter; and generate a second data signal at the first transmitter, wherein the second ranging signal is transmitted using the first range of frequencies, and the second data signal is transmitted using the second range of frequencies.

Method(s) and processor(s) or other means may further or alternatively: generate a second ranging signal at the first transmitter; and generate a second data signal at the first transmitter. In one embodiment, the second ranging signal is transmitted using the second range of frequencies, and the second data signal is transmitted using the first range of frequencies. In one embodiment, the second ranging signal is transmitted using a third range of frequencies, and the second data signal is transmitted using a fourth range of frequencies.

In one embodiment, the first ranging signal is transmitted using a first code, and the first data signal is transmitted using a second code. In one embodiment, the first code and the second code are orthogonal to each other. In one embodiment, the first code and the second code are not orthogonal to each other.

In one embodiment, the first ranging signal is transmitted using a first carrier wave, the first data signal is transmitted using a second carrier wave, and the first carrier wave and the second carrier wave are out of phase with respect to each other (e.g., by 90 degrees).

Method(s) and processor(s) or other means may further or alternatively: generate a second ranging signal at the first transmitter; and generate a second data signal at the first transmitter. In one embodiment, the second ranging signal is transmitted using the first carrier wave, and the second data signal is transmitted using the second carrier wave.

Method(s) and processor(s) or other means may further or alternatively: generate a second ranging signal at the first transmitter; and generate a second data signal at the first transmitter. In one embodiment, the second ranging signal is transmitted using the second carrier wave, and the second data signal is transmitted using the first carrier wave.

In one embodiment, the first ranging signal and the first data signal are separately transmitted based on at least two of time, frequency, code and phase.

In one embodiment, the first ranging signal and the first data signal are transmitted at the same power level. In one embodiment, the first ranging signal and the first data signal are transmitted at different power levels.

Method(s) and processor(s) or other means may further or alternatively: generate a second ranging signal at a second transmitter; generate a second data signal at the second transmitter; and separately transmit, from the second transmitter, the second ranging signal and the second data signal using (1) a different transmission time period for each signal, (2) a different frequency for each signal, (3) a different code for each signal, or (4) a different phase for each signal. In one embodiment, "each signal" refers to the second ranging and data signals. In another embodiment, "each signal" refers to the first and second ranging and data signals.

It is noted that a hybrid signal could also be transmitted using different time periods, frequencies, codes, and/or phases in addition to the ranging signals and/or the data signals, where the hybrid signal comprises ranging information (e.g., from a ranging signal) and non-ranging information (e.g., from a data signal).

By way of example, not by way of limitation, method(s) and processor(s) or other means may: acquire and process a first ranging signal that was transmitted from a first transmitter using one or more of (1) a first transmission time period, (2) a first frequency, (3) a first code, and (4) a first phase; and acquire and process a first data signal that was transmitted from the first transmitter using one or more of (1) a second transmission time period, (2) a second frequency, (3) a second code, and (4) a second phase. In one embodiment, the first data signal includes information that specifies one or more atmospheric conditions measured at the first transmitter and information that specifies the location of the first transmitter.

Method(s) and processor(s) or other means may further or alternatively: identify a measurement of pressure at a location of a mobile device; and estimate aspects of the location of the mobile device using the measurement of pressure, and also information extracted from the first ranging signal and the first data signal during the processing of those signals. For example, the aspects may include one or more position coordinates (latitude, longitude, altitude), or a region, neighborhood or building within which the mobile device resides.

In one embodiment, the one or more of (1) the first transmission time period, (2) the first frequency, (3) the first code, and (4) the first phase includes two or more of (1) the first transmission time period, (2) the first frequency, (3) the first code, and (4) the first phase. In one embodiment, the one or more of (1) the second transmission time period, (2) the second frequency, (3) the second code, and (4) the second phase includes two or more of (1) the second transmission time period, (2) the second frequency, (3) the second code, and (4) the second phase.

In one embodiment, the one or more of (1) the first transmission time period, (2) the first frequency, (3) the first code, and (4) the first phase includes three or more of (1) the first transmission time period, (2) the first frequency, (3) the first code, and (4) the first phase. In one embodiment, the one or more of (1) the second transmission time period, (2) the second frequency, (3) the second code, and (4) the second phase includes three or more of (1) the second transmission time period, (2) the second frequency, (3) the second code, and (4) the second phase.

In one embodiment, the one or more of (1) the first transmission time period, (2) the first frequency, (3) the first code, and (4) the first phase includes all of (1) the first transmission time period, (2) the first frequency, (3) the first code, and (4) the first phase. In one embodiment, the one or more of (1) the second transmission time period, (2) the second frequency, (3) the second code, and (4) the second phase includes all of (1) the second transmission time period, (2) the second frequency, (3) the second code, and (4) the second phase.

Discussion herein related to terrestrial "transmitters" extends to satellite or other beacons such that the satellites or other beacons generate ranging signals and data signals and separately transmit them based on time, frequency, code, and/or phase allocations.

Examples of Other Features in Some Embodiments

The illustrative methods described herein may be implemented, performed, or otherwise controlled by suitable hardware known or later-developed by one of skill in the art, or by firmware or software executed by processor(s), or any combination of hardware, software and firmware. Software may be downloadable and non-downloadable at a particular system. Such software, once loaded on a machine, changes the operation of that machine.

Systems on which methods described herein are performed may include one or more means that implement those methods. For example, such means may include processor(s) or other hardware that, when executing instructions (e.g., embodied in software or firmware), perform any method step disclosed herein. A processor may include, or be included within, a computer or computing device, a controller, an integrated circuit, a "chip", a system on a chip, a server, other programmable logic devices, other circuitry, or any combination thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement any or all of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

All of the information disclosed herein may be represented by data, and that data may be transmitted over any communication pathway using any protocol, stored on data source(s), and processed by a processor. Transmission of data may be carried out using a variety of wires, cables, radio signals and infrared light beams, and an even greater variety of connectors, plugs and protocols even if not shown or explicitly described. Systems may exchange information with each other using any communication technology. Data, instructions, commands, information, signals, bits, symbols, and chips and the like may be represented by voltages, currents, electromagnetic waves, magnetic fields or particles, or optical fields or particles.

Features in system figures that are illustrated as rectangles may refer to hardware, firmware or software. It is noted that lines linking two such features may be illustrative of data transfer between those features. Such transfer may occur directly between those features or through intermediate features. Where no line connects two features, transfer of data between those features is contemplated unless otherwise stated.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

It is noted that the term "GPS" may refer to any Global Navigation Satellite Systems (GNSS), such as GPS, GLONASS, Galileo, and Compass/Beidou, and vice versa.

A "mobile device" may be in the form of a computing device (e.g., a mobile phone, a tablet, a PDA, a laptop, a wearable, a digital camera, a tracking tag). A mobile device may also take the form of any component of the mobile device, including a processor.

Certain aspects disclosed herein relate to a positioning system that estimates the positions of things—e.g., where the position is represented in terms of: latitude, longitude, and/or altitude coordinates; x, y, and/or z coordinates; angular coordinates; or other representations. Positioning systems use various techniques to estimate the position of an thing (e.g., a mobile device), including trilateration, which is the process of using geometry to estimate the position using distances traveled by different "ranging" signals that are received by the mobile device from different beacons (e.g., transmitters, satellites, antennas). If the transmission time and reception time of a ranging signal are known, then the difference between those times multiplied by speed of light would provide an estimate of the distance traveled by that ranging signal. These estimates of distance are often referred to as "range" measurements. When errors in the measured time(s) are present, a "range" measurement is typically referred to as a "pseudorange" measurement. Thus, a "pseudorange" measurement is a type of "range" measurement. Positioning systems and methods that estimate a position of a mobile device based on signaling from beacons (e.g., transmitters, and/or satellites) are described in co-assigned U.S. Pat. No. 8,130,141, issued Mar. 6, 2012, and U.S. patent application Ser. No. 13/296,067, filed Nov. 14, 2011, which are incorporated herein in their entirety and for all purposes, except where their content conflicts with the content of this disclosure.

RELATED APPLICATIONS

This application relates to U.S. Ser. No. 61/972,190, filed Mar. 28, 2014, and to U.S. Ser. No. 13/535,128, filed Jun. 27, 2012, the contents of which are hereby incorporated by reference herein in their entirety except where parts of the content conflict with the content of this disclosure.

The invention claimed is:

1. A method for transmitting ranging signals and data signals from one or more transmitters in a network of transmitters, the method comprising:
   generating a first ranging signal at a first transmitter;
   generating a first data signal at the first transmitter,
   wherein the first data signal includes information that specifies one or more atmospheric conditions measured at the first transmitter and information that specifies the location of the first transmitter; and
   separately transmitting, from the first transmitter, the first ranging signal and the first data signal using (1) a different transmission time period for each signal, (2) a different frequency for each signal, (3) a different code for each signal, or (4) a different phase for each signal, wherein the first ranging signal is transmitted using a first range of frequencies, and wherein the first data signal is transmitted using a second range of frequencies, and wherein the first ranging signal and the first data signal are transmitted during overlapping time periods.

2. The method of claim 1, wherein the first ranging signal is transmitted using a first code, and wherein the first data signal is transmitted using a second code.

3. The method of claim 1, wherein the first ranging signal and the first data signal are transmitted at different power levels.

4. The method of claim 1, wherein the first ranging signal is transmitted using a first carrier wave, wherein the first data signal is transmitted using a second carrier wave, and wherein the first carrier wave and the second carrier wave are out of phase with respect to each other.

5. The method of claim 1, wherein a size of the first range of frequencies is different than a size of the second range of frequencies.

6. A method for transmitting ranging signals and data signals from one or more transmitters in a network of transmitters, the method comprising:
generating a first ranging signal at a first transmitter;
generating a first data signal at the first transmitter,
wherein the first data signal includes information that specifies one or more atmospheric conditions measured at the first transmitter and information that specifies the location of the first transmitter; and
separately transmitting, from the first transmitter, the first ranging signal and the first data signal using (1) a different transmission time period for each signal, (2) a different frequency for each signal, (3) a different code for each signal, or (4) a different phase for each signal,
wherein the first ranging signal is transmitted using a first code, and wherein the first data signal is transmitted using a second code.

7. The method of claim 6, wherein the first code and the second code are orthogonal to each other.

8. The method of claim 6, wherein the first ranging signal is transmitted using a first carrier wave, wherein the first data signal is transmitted using a second carrier wave, and wherein the first carrier wave and the second carrier wave are out of phase with respect to each other.

9. The method of claim 6, wherein the first ranging signal is transmitted during a first period of time, and wherein the first data signal is transmitted during a second period of time.

10. The method of claim 6, wherein the first ranging signal and the first data signal are transmitted at different power levels.

11. One or more non-transitory processor-readable media embodying program instructions that, when executed by one or more processors, cause the one or more processors to implement a method for transmitting ranging signals and data signals from one or more transmitters in a network of transmitters, the method comprising:
generating a first ranging signal at a first transmitter;
generating a first data signal at the first transmitter,
wherein the first data signal includes information that specifies one or more atmospheric conditions measured at the first transmitter and information that specifies the location of the first transmitter; and
separately transmitting, from the first transmitter, the first ranging signal and the first data signal using (1) a different transmission time period for each signal, (2) a different frequency for each signal, (3) a different code for each signal, or (4) a different phase for each signal,
wherein the first ranging signal is transmitted using a first range of frequencies, and wherein the first data signal is transmitted using a second range of frequencies, and
wherein the first ranging signal and the first data signal are transmitted during overlapping time periods.

12. The one or more non-transitory processor-readable media of claim 11, wherein the first ranging signal is transmitted using a first code, and wherein the first data signal is transmitted using a second code.

13. The one or more non-transitory processor-readable media of claim 11, wherein the first ranging signal and the first data signal are transmitted at different power levels.

14. The one or more non-transitory processor-readable media of claim 11, wherein the first ranging signal is transmitted using a first carrier wave, wherein the first data signal is transmitted using a second carrier wave, and wherein the first carrier wave and the second carrier wave are out of phase with respect to each other.

15. The one or more non-transitory processor-readable media of claim 11, wherein a size of the first range of frequencies is different than a size of the second range of frequencies.

16. One or more non-transitory processor-readable media embodying program instructions that, when executed by one or more processors, cause the one or more processors to implement a method for transmitting ranging signals and data signals from one or more transmitters in a network of transmitters, the method comprising:
generating a first ranging signal at a first transmitter;
generating a first data signal at the first transmitter,
wherein the first data signal includes information that specifies one or more atmospheric conditions measured at the first transmitter and information that specifies the location of the first transmitter; and
separately transmitting, from the first transmitter, the first ranging signal and the first data signal using (1) a different transmission time period for each signal, (2) a different frequency for each signal, (3) a different code for each signal, or (4) a different phase for each signal,
wherein the first ranging signal is transmitted using a first code, and wherein the first data signal is transmitted using a second code.

17. The one or more non-transitory processor-readable media of claim 16, wherein the first code and the second code are orthogonal to each other.

18. The one or more non-transitory processor-readable media of claim 16, wherein the first ranging signal is transmitted using a first carrier wave, wherein the first data signal is transmitted using a second carrier wave, and wherein the first carrier wave and the second carrier wave are out of phase with respect to each other.

19. The one or more non-transitory processor-readable media of claim 16, wherein the first ranging signal is transmitted during a first period of time, and wherein the first data signal is transmitted during a second period of time.

20. The one or more non-transitory processor-readable media of claim 16, wherein the first ranging signal and the first data signal are transmitted at different power levels.

* * * * *